No. 768,213. PATENTED AUG. 23, 1904.
H. W. BRUTLAG.
BELT GUIDE.
APPLICATION FILED FEB. 16, 1904.
NO MODEL.

WITNESSES:

INVENTOR
Herman W. Brutlag
BY
Attorney

No. 768,213. Patented August 23, 1904.

UNITED STATES PATENT OFFICE.

HERMAN W. BRUTLAG, OF FULDA, MINNESOTA.

BELT-GUIDE.

SPECIFICATION forming part of Letters Patent No. 768,213, dated August 23, 1904.

Application filed February 16, 1904. Serial No. 193,821. (No model.)

*To all whom it may concern:*

Be it known that I, HERMAN W. BRUTLAG, a citizen of the United States, residing at Fulda, in the county of Murray and State of Minnesota, have invented certain new and useful Improvements in Belt-Guides, of which the following is a specification.

My invention relates to belt-guides for general purposes, but more especially to that class of belt-guides designed for use on threshing-machines or other mechanism usually operated in the open field or out of doors; and the objects of said invention are to provide a simple and inexpensive device for preventing driving-belts from running off their pulleys when exposed to high winds or under any circumstances which have such tendencies.

The objects referred to are attained by means of the construction illustrated in the accompanying drawings, in which—

Figure 1:
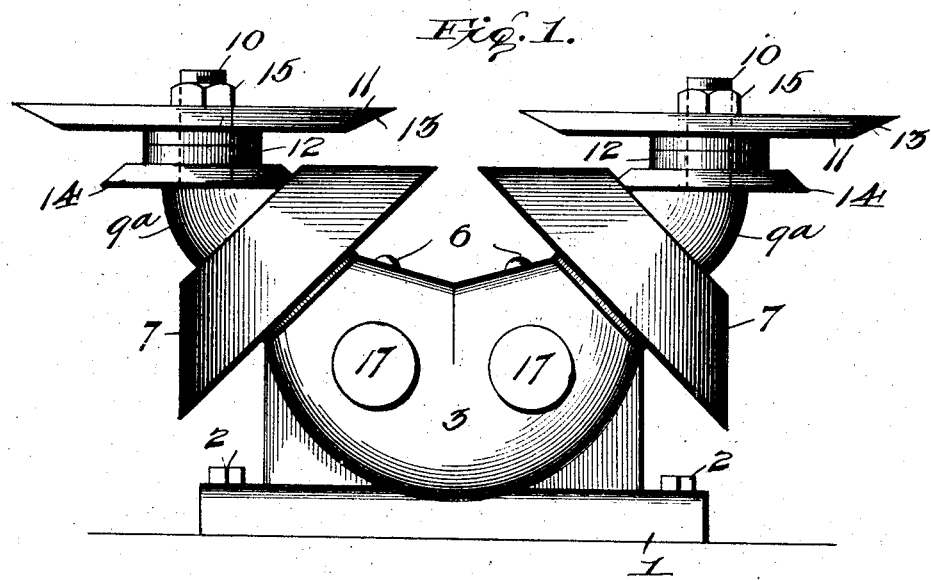
Figure 2:
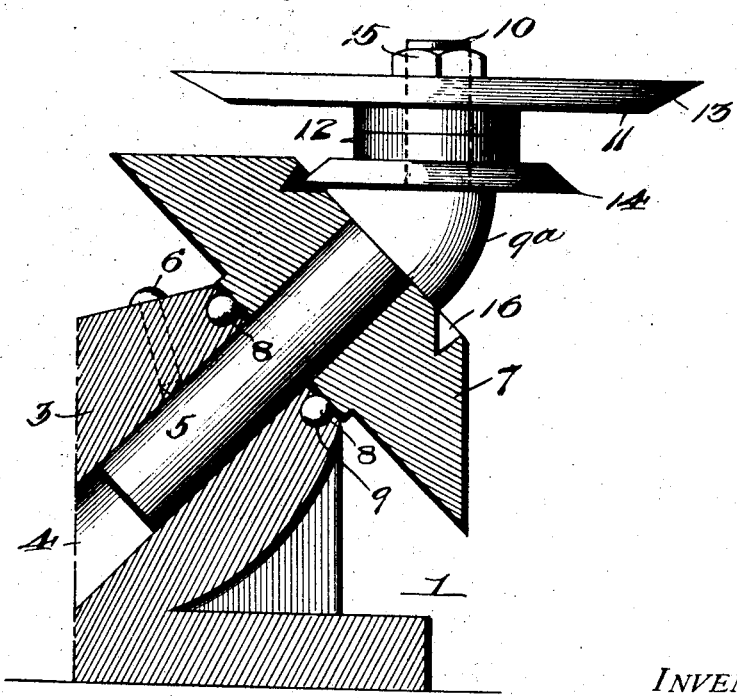

Figure 1 is a side view of a belt-guide made in accordance with my invention. Fig. 2 is a view in partial section of one-half of the belt-guide, as shown in Fig. 1.

The numeral 1 designates the base or support for the belt-guide, and this base may be provided with screws or bolts 2 for securing the guide in place along the line of the belting. Extending above the base 1 is a bearing-block 3, having inclined sockets or bores 4 for the axles or stub-shafts 5. These stub-shafts are rigidly secured in the sockets 4 by set screws or pins 6.

Since the construction of each half of the belt-guide is the counterpart of the other half, a description of one half will suffice for both. The beveled idler or belt-support 7 is journaled to revolve freely upon the axle 5 and is supported upon balls 8, seated in a raceway 9 in the top of the bearing-block 3. Above the idler 7 the shaft 5 is provided with an enlargement $9^a$, and extending vertically from this enlargement and formed integrally therewith is a pintle or shaft 10 for the keeper-roll 11 and the edge bearing-hubs 12. The keeper-roll 11 has a beveled periphery 13, and a beveled pulley 14 is journaled to freely revolve on the pintle 10 under the roll 11, a nut 15 being used to hold the two rolls in place.

The hubs 12 are integral with the beveled pulleys 14, and similar hubs are formed on the keeper-rolls 11. The pulleys 14 and the rolls 11 are free to revolve independently on the pintle 10. The belt-support or idler 7 is provided with a groove 18 in its upper surface to give room for the beveled edge of the pulley 14. Two hand-oilers or oil-cans 17 may be held in convenient place for use on the guide by means of two perforations in which the tubes of the oil-cans may be inserted. These oil-cans may be readily removed from the perforations whenever it is desired to use them about the machinery.

From the foregoing it will be obvious that a belt leading from the driving-pulleys of a machine may be passed between the idlers 7 and the keeper-roll 11, and the belt will be prevented from running off the pulleys, the edge of the belt running against the hubs 12 and very little friction being created between the belt and guide.

Having thus fully described my invention, what I claim is—

1. A belt-guide comprising a base having inclined sockets, shafts mounted in the sockets, beveled belt-supports mounted to revolve upon the shaft bearing-balls for said supports, there being enlargements on the shafts above the belt-supports, and two beveled rolls journaled upon a vertical pin extending from each shaft, substantially as described.

2. A belt-guide comprising a base having inclined sockets, shafts fitted in the sockets, beveled idlers journaled to revolve on the shafts, bearing-balls for said beveled idlers, there being enlargements on the shafts above the idlers, beveled rolls, journaled on vertical pins extending from the shafts, the idlers each having a groove to admit the beveled edge of the lower beveled rolls, substantially as described.

In testimony whereof I affix my signature in presence of two witnesses.

HERMAN W. BRUTLAG.

Witnesses:
M. E. FOLEY,
JOHN BUHNER.